Sept. 27, 1927.
W. W. BLAKELY
1,643,802
HOLDDOWN DEVICE FOR VEHICLES
Filed June 2, 1924
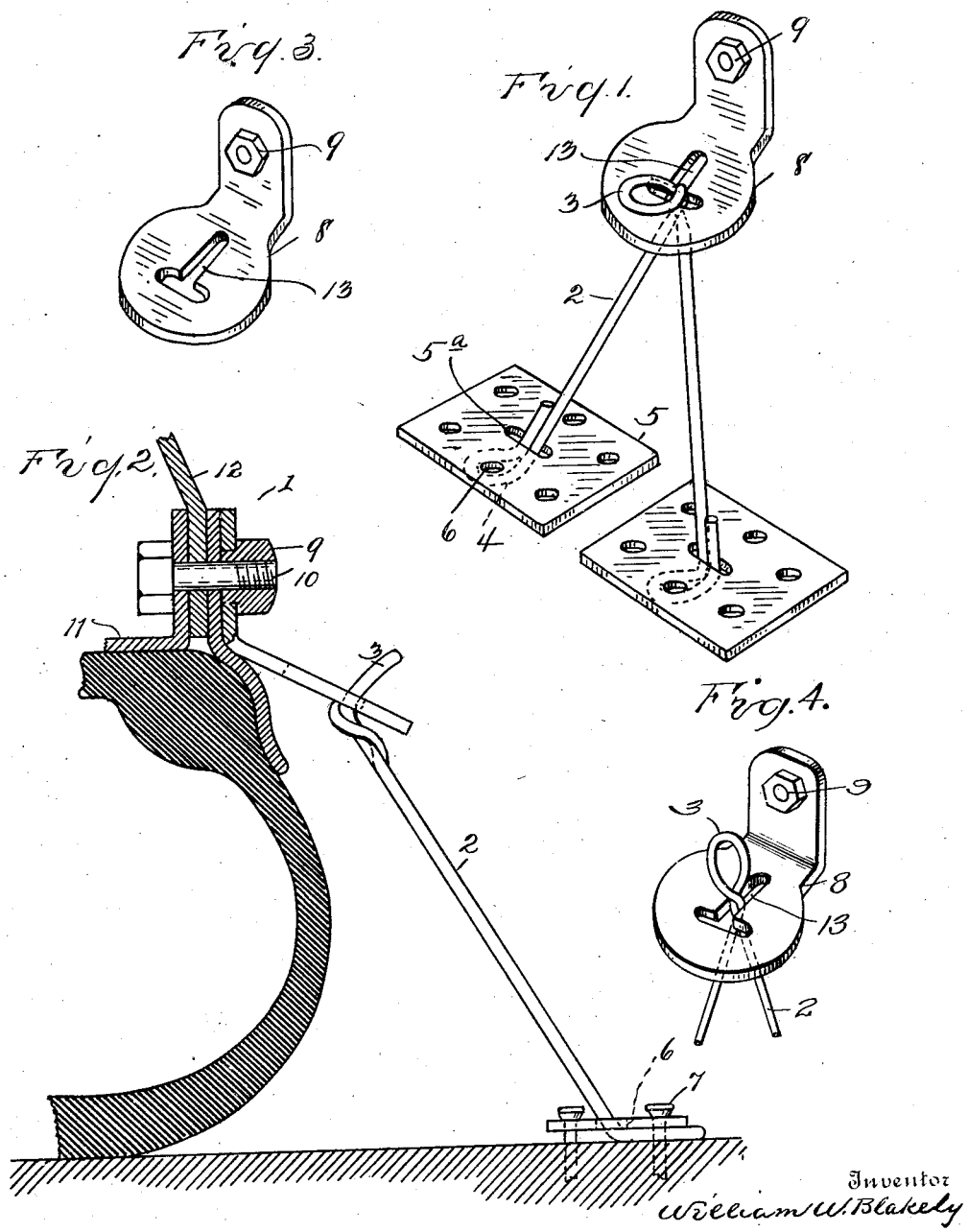
Inventor
William W. Blakely
By Whittemore Hulbert Whittemore
& Belknap   Attorneys Patented Sept. 27, 1927.

1,643,802

UNITED STATES PATENT OFFICE.

WILLIAM W. BLAKELY, OF DETROIT, MICHIGAN.

HOLD-DOWN DEVICE FOR VEHICLES.

Application filed June 2, 1924. Serial No. 717,352.

This invention relates to hold-down devices, and refers more particularly to such devices as are employed in freight cars and other carriers for preventing movement of a vehicle during shipment.

It is the object of the invention to provide a hold-down device of the described character comprising a tie member adapted to be secured to a suitable support such as a floor or wall of a carrier, and further comprising an attachment member which may be engaged with a vehicle during the final assembly thereof and which will not interfere with driving or towing of the vehicle from the place of assembly to the freight car or other carrier, the tie member and attachment member being adapted for an engagement which may be very quickly established when the vehicle is properly positioned in the carrier.

In the drawings:—

Figure 1 is a perspective view of the improved device showing the quick detachable engagement thereof with a plate adapted to be secured to a wheel;

Figure 2 is a cross section view of the wheel showing the described device engaged therewith;

Figure 3 is a perspective detail view of the attachment plate.

Figure 4 is a fragmentary perspective view of the adapter plate and tie member before the eye of the latter has been bent at an angle to the leg portions thereof.

In these views the reference character 1 designates a wheel, the body of which is of the disk type although the invention is equally applicable to any type of wheel. 2 is a tie member formed by a rod or wire bent to an inverted V-shape and having at its apex a loop 3 which is bent at substantially a right angle to the plane of the tie member and will be defined hereinafter as a head. The lower ends of the tie member 2 are bent and looped to form securing feet 4, adapted to be clamped to a floor or other surface by a pair of nailing plates 5 which are slotted at 5ª to engage the legs of the tie member just above said loops. The plates 4 are each formed with holes 6 adapting them to be secured to the floor by nails 7.

For engaging the upper end of the tie member with a vehicle wheel (or some other part of a vehicle) there is employed an attachment plate 8 which has swivelly mounted in its upper portion a nut 9 for engagement by one of the bolts 10 which attach the rim 11 to the body 12 of said wheel. The lower portion of said plate is inclined at approximately 45° to the upper portion and is formed with a slot 13 having approximately an inverted key-hole shape. Said slot is of sufficient length and width to permit the head 3 of the tie member to be passed upwardly through said slot when said member is turned sideways, as indicated in dash lines in Figure 1, and the lower portion of said slot is proportioned to receive the restricted neck of the tie member formed just below the head 3.

From the preceding description it will be evident that the invention establishes an engagement between the tie member and its securing plate 8 that permits a very quick attachment or detachment. One of the primary advantages derived from this connection between said parts lies in the fact that the securing plate 8 may be attached to the wheel during the final assembly thereof at the factory. Thus the vehicle may be driven or towed to the freight depot or other point of shipment and the tie member may be quickly applied after the vehicle is positioned in the carrier. It is to be noted that the securing plate 8 is of such a nature as to form no obstacle to driving the vehicle, as described, to the point of shipment. The engagement of the tie member both with the plate 8 and the foot plates 4 is sufficiently loose to allow such limited play of the vehicle relative to the supporting surface, as is essential to permit some response of the vehicle to shocks and stresses encountered during shipment.

What I claim as my invention is:—

1. A securing device for vehicles, comprising a tie member having diverging legs attachable to a suitable support and having a head at apex of said legs and a securing element having an opening detachably receiving said head.

2. A securing device for vehicles comprising an inverted substantially V-shaped tie member having a head at the apex of the V and a securing plate formed with a slot having a portion sufficiently extended in one direction to provide a passage for said head, and having a shorter transverse portion normally receiving a portion of the tie member adjacent to said head.

3. A securing device for vehicles, comprising a tie member formed of an elongated member intermediately bent to form legs terminally having securing feet, and forming a bent loop at its apex, and a securing plate having a slot detachably engageable by said loop.

4. A securing device for vehicles, comprising a tie member having a head at one end and a neck adjacent thereto, said head disposed at substantially right angles to said tie member, a securing element formed with a slot extended in one direction to form a passage for said head in one position of the tie member and relatively restricted in the transverse direction to prevent passage of said head when the tie member has been turned transversely to its first position.

5. The combination with an article of merchandise and a support therefor, of a tie member secured to said support having a loop portion, projecting at substantially right angles therefrom, and an attaching plate secured to said article having a substantially T-shaped slot detachably receiving the loop portion aforesaid of said tie member.

6. The combination with an article of merchandise and a support therefor, and means for holding the article upon the support including an inverted V-shaped tie member having a loop portion at the apex of the V, and an attaching plate carried by the article having a slot detachably receiving said loop portion.

7. A securing device for vehicles including a tie member having upwardly inclined legs provided at their lower ends with attaching feet and provided at their upper end with a common head, said feet and head being substantially parallel and extending at substantially right angles to said legs, and an attaching plate having an opening for receiving a wheel bolt and having a slot detachably receiving said head.

8. A securing device for vehicles comprising a swivelled plate having a slot therein, and a tie member having diverging legs attachable to a support and having a head at the apex of said legs extending at substantially right angles to said legs and detachably engaging the slot aforesaid in said plate.

9. A securing device for vehicles comprising an attaching plate having an opening for receiving a wheel bolt, and a tie member having a pair of legs provided at their lower ends with attaching feet and provided at their upper ends with a common head projecting at substantially right angles to said legs, and detachably engaging the plate aforesaid.

In testimony whereof I affix my signature.

WILLIAM W. BLAKELY.